(No Model.) 4 Sheets—Sheet 4.
E. D. STODDER.
WAVE POWER MOTOR.
No. 441,449. Patented Nov. 25, 1890.
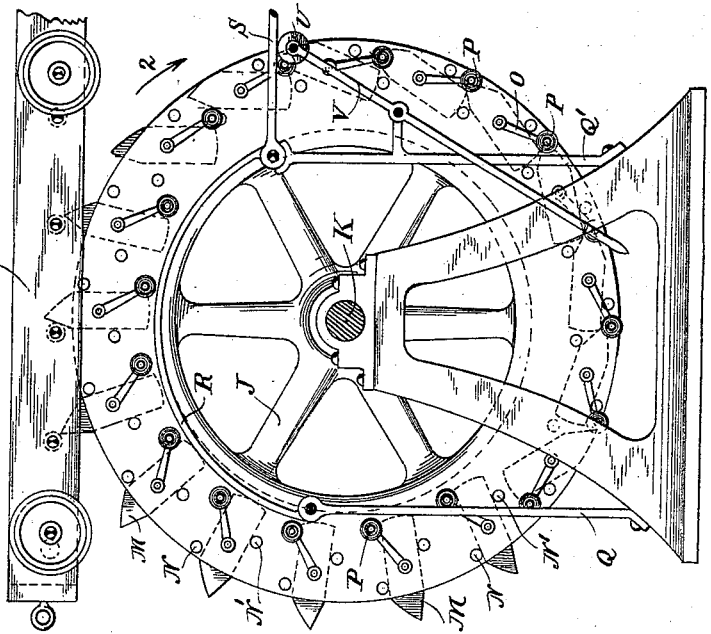
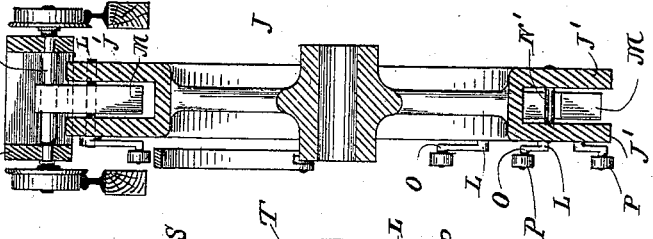
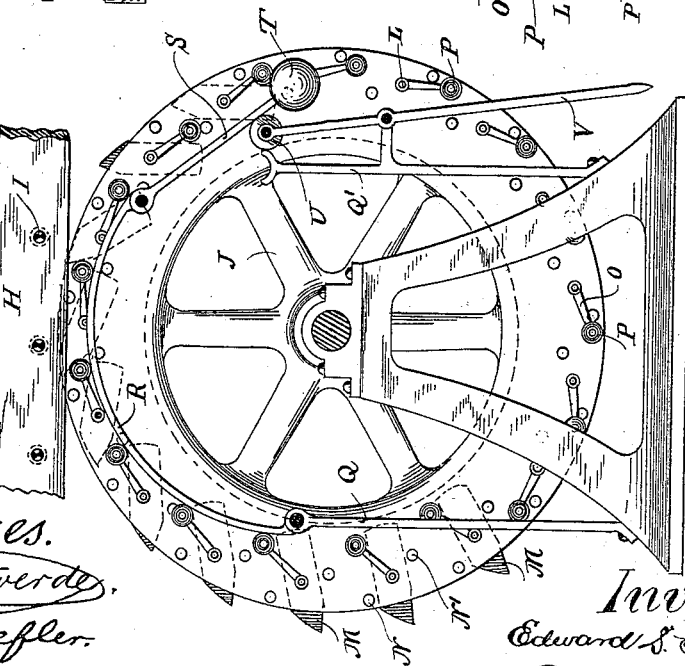
Witnesses.
F. E. Monteverde
M. G. Loefler
Inventor.
Edward D. Stodder
By Boone & Acker

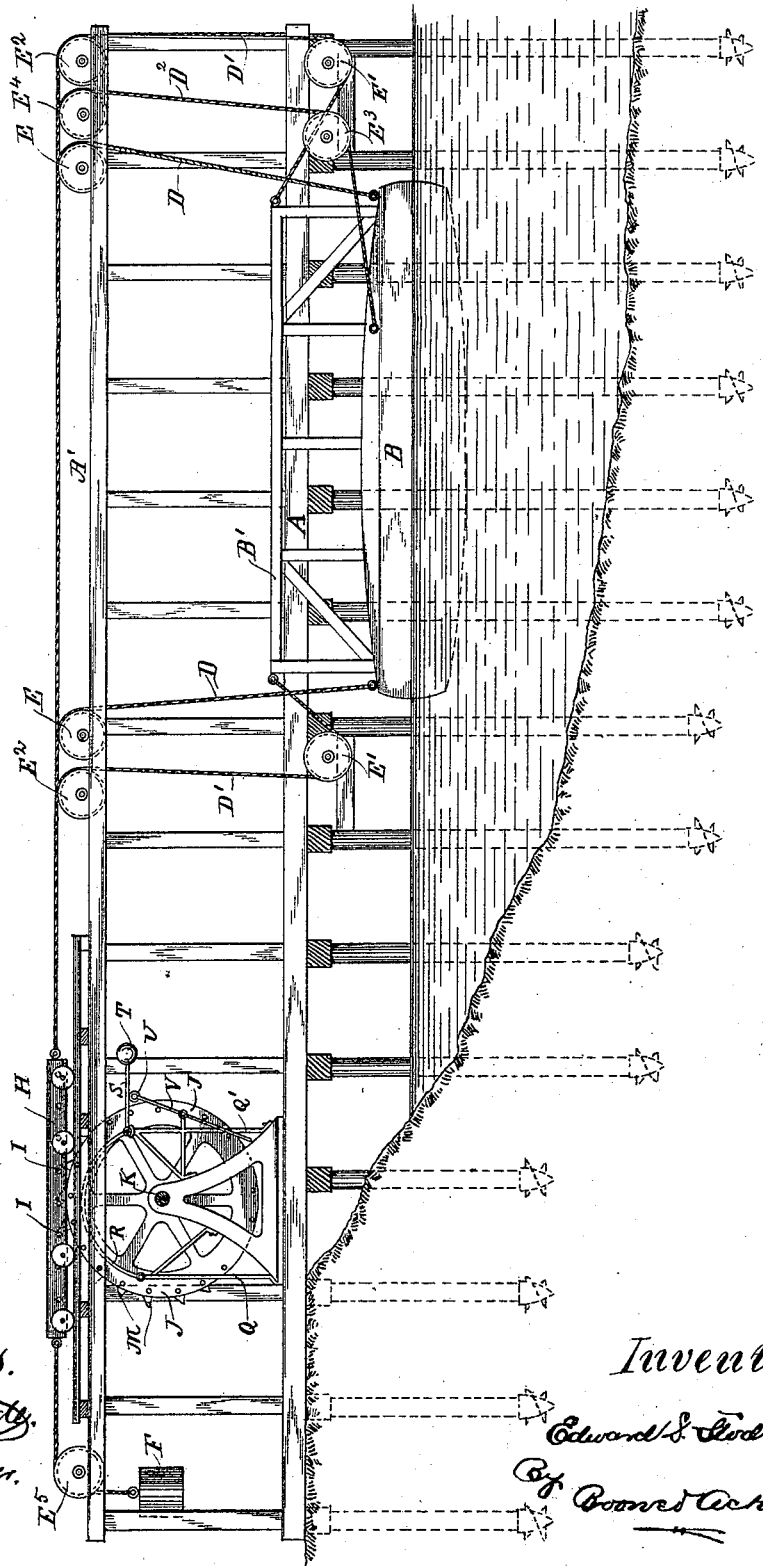

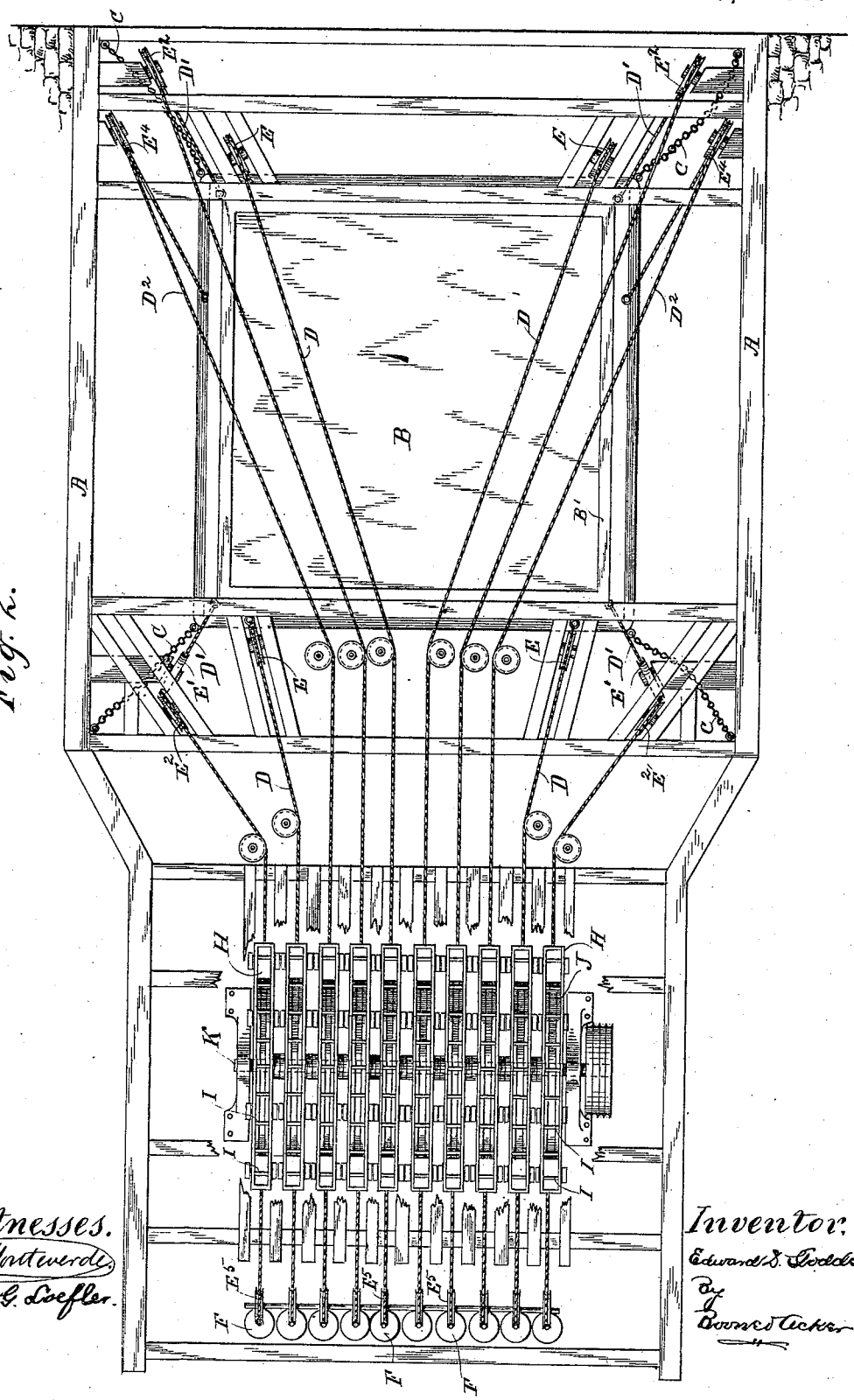

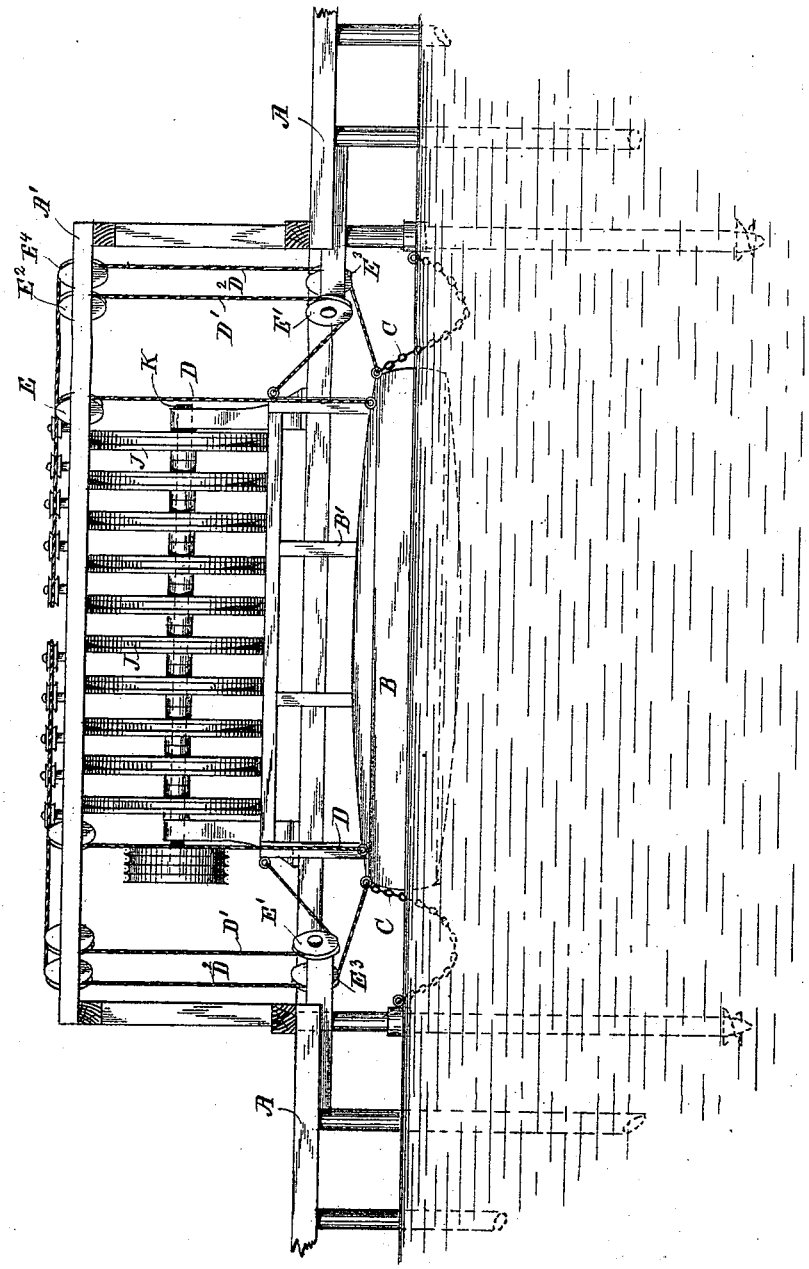

UNITED STATES PATENT OFFICE.

EDWARD D. STODDER, OF SAN FRANCISCO, CALIFORNIA.

WAVE-POWER MOTOR.

SPECIFICATION forming part of Letters Patent No. 441,449, dated November 25, 1890.

Application filed August 24, 1889. Serial No. 321,891. (No model.)

*To all whom it may concern:*

Be it known that I, EDWARD D. STODDER, of the city and county of San Francisco, State of California, have invented an Improvement in Wave-Power Motors; and I hereby declare the following to be a full, clear, and exact description of the same.

My invention relates to certain new and useful improvements in wave-power motors; and it consists of the parts and details of construction as will be hereinafter fully set forth in the drawings, and described and pointed out in the specification.

My invention relates to an improved mechanism and apparatus for utilizing the power and motion of waves wherever a sufficient movement or swell can be obtained to set in motion a buoy or weight.

The object of my invention is to provide a machine or apparatus that will be set in motion and operated continuously by means of a buoy or float resting upon the water and tossed about by the waves, and in which every motion of the float or buoy produced by the action of the waves, whether regular or irregular, is utilized for positive power purposes.

My invention consists in providing an apparatus adapted automatically to adjust itself to any stage of tide, so as to utilize power to be derived from the various motions imparted. To the buoy or float I attach one end of a number of cables at such points as will insure a strain upon one or more of the cables whenever the float is moved and in whatever direction it moves. These cables are carried over or under sheaves or pulleys, as the case may be, and each one is connected with a rack-bar that moves horizontally over a ratchet or sprocket wheel on a driving or power shaft. The shaft carries as many ratchet-wheels as there are cables and rack-bars, and each cable is kept taut by a counter-weight connected with the opposite end of the rack-bar. The ratchet-wheels are so constructed that they engage with the rack-bars only in one direction, so that the rack-bars will move freely in the opposite direction without disturbing them. Each movement of the float will therefore bring one or more of the rack-bars in engagement with the ratchet-wheels and impart movement to the driving-shaft and cause it to be rotated continuously in one direction, as will more fully appear from the drawings and accompanying detailed description.

I am aware that other inventions make use of piers, floats, cables, counter-weights, guiding-sheaves, and other mechanism to utilize wave-power; but my invention is very different from any of which I have any knowledge, inasmuch as the float is adapted to have free motion in any direction in which the waves could possibly move it, and it is impossible for the waves to move it in any direction without imparting a continuous rotary motion to the main shaft.

Referring to the drawings forming a part of this application, in which similar letters of reference are used to denote corresponding parts throughout the entire specification and several views, Figure 1 is a side elevation. Fig. 2 is a plan view. Fig. 3 is an end view. Fig. 4 is a detail view of one of the wheels and the mechanism by which it is connected and disconnected with the reciprocating rack above it. Fig. 5 is a sectional view thereof; and Fig. 6 is a view similar to Fig. 4, showing the spurs or teeth out of engagement.

In carrying out my invention I construct an iron pier or piers A on three sides of a large square or oblong space, the other side or end of which is to be left open and exposed to the sea. On and above the piers and over the open space I build a frame-work A', which is to support the various sheaves over which the cables run, as will be described hereinafter. The general principles of the piers A and frame-work A' are clearly shown in Figs. 1, 2, and 3.

Within the space between the piers I arrange a large iron float B in such a manner that it can be tossed or moved to a limited extent in any direction by the action of the waves and the rise and fall of the tide. Upon this float is a frame-work B', the object of which will be described hereinafter. The float may be provided with valves, (not shown,) through which water may be admitted to increase the weight, if desired, and with a pump to empty it, if necessary. The float is to be of such a size as to leave a space of several feet between it and the piers.

Attached to the float and the piers in any suitable place or manner are four or more strong anchor chains or cables C, so adjusted as to allow the float to move in any direction, but not allow it to strike any part of the piers, as is clearly shown in Figs. 2 and 3.

In order to convert all the various irregular motions of the float into a continuous rotary motion, I first convert them into a number of horizontal reciprocating motions by attaching ten or more galvanized steel-wire cables to the float at various points, which converts its motions as follows: One end of four of these cables (marked D) is fastened to the float B—one at or near each corner—and pass from there over the sheaves E, thence in a horizontal direction to the sheaves $E^5$, over which they hang, each with a counter-weight F suspended from the end thereof. It is obvious that as any corner of the float rises the cable D fastened to it will be drawn up by the counter-weight F on the other end falling, and as said corner of the float falls it will draw the cable down and raise the counter-weight on the other end, thus imparting a horizontal reciprocating motion to the cable between the sheaves E and $E^5$. The weight of the float being much greater than the counter-weights F, the four cables D receive their power only as the corner of the float to which they are attached falls or moves farther from its sheave E, and the power is transmitted from the cables only when they are moving in the direction indicated by the arrow 1. One end of four of the cables marked D', I fasten to the frame-work B' at or near each corner and pass the same under the sheaves E', over the sheaves $E^2$, thence over the sheaves $E^5$ to a counter-weight F, similar to cables D. By this arrangement the cables D' receive their power only as the corner of the float to which they are attached rises or moves farther from its sheave E', and are always moving in the opposite direction from the cables D, fastened to the same corner of the float, but transmitting their power only when moving in the direction indicated by the arrow 1, the same as cables D. The object of the frame-work B', to which the cables D' are attached, is to allow the sheaves E' to be placed above the general level of the water, it being necessary that the point of attachment of the cables D' should always be above them, so as to always receive the benefit of the rising motion of the float. One end of two of the cables marked $D^2$, is fastened to the float—one on each side— and pass from there under the sheaves $E^3$, over the sheaves $E^4$, thence over the sheaves $E^5$ to a counter-weight F, similar to the cables D and D'. It is obvious that by this arrangement the cables $D^2$ receive their power as the float is driven toward the shore, but transmit it only in the same direction as the cables D and D'. The sheaves E' and $E^3$ are to be fastened to the piers in any suitable place and manner, sheave E' always being below the point of attachment of the cables D'. The sheaves E, $E^2$, and $E^4$ are to be fastened in any suitable place and manner to the frame-work A' over the float and the open space in which it moves. The sheaves $E^5$ may be placed at any suitable place, and other guiding-sheaves may be fastened on the frame-work A' to make all the cables move in a parallel direction over the wheels J, described hereinafter.

The general principles of the attachment, action, and functions of the cables, sheaves, and counter-weights are clearly shown in Figs. 1, 2, and 3, and herein lies the principal part of my invention, and wherein it is very different from any other of which I have any knowledge, the results obtained being a continuous reciprocating motion of the ten cables, some always moving in directly the opposite direction to some of the others, no matter what way the float is moved by the action of the waves.

Having shown how the horizontal reciprocating motions are obtained, I will now explain how they are converted into a rotary motion. This may be done with ordinary ratchet-wheels, or with friction-clutches, and in many other ways; but in this case I prefer the following-described mechanism: For each cable and connected to it at any suitable place between the sheaves E $E^2$ and $E^5$ is an iron frame or rack H, that in appearance would resemble a long heavy iron ladder with numerous short cross-bars I, the said racks to be mounted on wheels and rails to reduce friction and properly guide them and each rack connected to its corresponding cable, as shown in Figs. 1 and 2, or the cable may be in one continuous piece from the float to their counter-weights F and the racks connected to them by any suitable grip or clutch, (not shown,) so that all the horizontal reciprocating motions of the cables, as previously described, will be transmitted to the racks. Under the ten racks ten large wheels J are fastened to one main shaft K, so that they will all revolve together. These wheels are to be made with a flange J' on each side of the rim, so as to leave a groove all around the rim, as shown in Fig. 5. Journaled in both of these flanges are a number of small shafts L. Between the flanges and fastened to each of these shafts is a spur or tooth M. Fastened in both flanges and passing through the groove are a number of stops or strong bolts N and N'—one on each side of every spur—so arranged as to limit the movements of the spur, as described hereinafter. All the spurs are to be so adjusted or balanced that as the wheels revolve and the spurs come near the top of the wheel one end of them will project beyond the rim and come in contact with the cross-bars I in the rack above it, and if the rack is moving toward the float the spurs will be forced against the stops N and N' and offer the same resistance as a solid tooth or spur, as shown in Fig. 4, and consequently the wheels J and shaft K will revolve in the direction indicated by the arrow 2; but when the rack is moving in the opposite direction and the cross-bars come in contact with the projecting end of the spurs they will tip to the left into the groove in the rim of the wheel and offer no resistance. Thus as the racks are continuously moving back and forth the shaft K and wheels J would continuously revolve in one direction.

As it would be desirable to stop the machinery at times, and it would be impossible to stop the motion of the float, all the large wheels and the main shaft may be stopped with one movement of a lever in the following manner:

To the small shafts L, projecting beyond the flanges on one side of the wheels, I secure one end of a crank-arm O, on the other end of which crank a roller P is journaled. It is evident that if the spurs M and the crank-arms O were each fastened to the same shaft the three pieces would be the same as one solid piece of the same shape, and which can be so adjusted that when the shaft is placed in proper journals the spurs will assume a vertical position and the heaviest end will always hang down if its action is unlimited; but if limited, as by the stops N and N', it would assume a position as nearly vertical as its limits would allow, as is clearly shown in Fig. 4. It is also evident that, no matter how heavy each of the spurs may be, if properly adjusted a slight pressure to the right on the lower end of the crank-arm O will tip the projecting end of the spur down to the left. Pivoted to a standard Q near the left edge of each of the wheels is a curved steel strap R. This strap curves from there directly under the rollers P, to where it is pivoted to the left end of the lever S near the right edge of the wheel. The lever S is a flat strap of steel, on the right end of which an iron weight T is fastened. Directly under the lever S a roller U is journaled on the end of a lever V. Said lever is pivoted to a standard Q'. The parts Q, Q', R, S, T, U, and V are all clearly shown in Figs. 1, 4, and 6. Figs. 1 and 4 show them as when not in use, the rollers P passing directly over the curved strap R but not touching it, the right end of R and the left end of S resting on the standard Q' and the right end of S and the weight T resting on the roller U on the end of the lever V, which is held in position by any suitable stop. (Not shown.) Changing the position of the lever V from that shown in Fig. 4 to that in Fig. 6 disconnects the wheels and racks as follows: The weight T is to be heavy enough so that when the upper end of the lever V is moved to the left it will fall and not only overbalance the weight of the curved strap R and raise that to the position shown in Fig. 6, but give it sufficient pressure against the rollers P to tip the projecting end of the spurs M down to the left into the groove in the wheel as it passes under the rack H, which would have to be moving to the left to permit the spurs to be tipped, because if it were moving to the right the cross-bars I would hold the spurs M rigidly against the stops N and N', as shown in Fig. 4, and the strap R would be held down by the rollers P, but the lever V would be free to move and would raise the weight T by the lever S, tipping up from where it is pivoted to the curved strap R. Then as soon as the rack moved to the left the spurs would be released, the weight T would fall and raise the curved strap R, and the rollers P would run up on it and tip the projecting end of the spurs down to the left, as clearly shown in Fig. 6, and thus, as each wheel is arranged the same, by connecting all the levers V and moving them together, as described, all the racks and wheels can be disconnected by moving a lever in one direction and connected again by reversing the lever.

It will be manifest that by making the racks long enough and allowing enough room for the rise and fall of the weights F the apparatus will automatically adjust itself to the different stages of the tide, because as the float rises or falls with the tide the position of the racks and weights is changed to correspond with the tide, the same as by the motion of the waves.

From the foregoing description it will be manifest that, as the ocean-waves are continuously in motion, by constructing an apparatus as shown and described continuous reciprocating and rotary motions can be obtained from the irregular motions of the waves, and the said reciprocating or rotary motions thus obtained can be utilized to run machinery in any suitable way and for any purpose desired for which said motions may be adapted. Furthermore, although it would be impossible to stop the motions of the float, the rotary motion could be stopped and started by simply moving a lever, as shown and described.

The number of floats, anchor-chains, cables, counter-weights, sheaves, racks, wheels, and other parts may be duplicated or increased and various other changes made without changing the principle of the invention. For instance, I have mentioned certain substances—such as iron and steel—and certain parts and mechanisms which I now consider best adapted to perform the various functions assigned to them for which other substances and parts may be substituted, as, in place of the galvanized steel-wire cables for transmitting motion and power from the float to the other mechanism, chains, ropes, or other flexible connections might be used. Rollers or sprocket-wheels might be used in place of the sheaves, sprocket-wheel chain used in place of the racks, and springs in place of the counter-weights T. These parts, individually considered, are not claimed herein, and I do not wish to limit my present invention to the use of these specific devices, as others may be employed to perform the same, or substantially the same, functions in the several combinations herein claimed, which, in so far as they are equivalents of the elements of combination claimed, I include herein as within my invention.

Having thus described my invention, what I claim as new, and desire to secure protection in by Letters Patent of the United States, is—

1. In a wave-power motor, the combination, with the automatically-adjusting float, of the reciprocating rack adapted to receive motion from the float through the medium of suitable connecting mechanism, and of the power-transmitting wheel or wheels located beneath the racks, substantially as set forth.

2. In a wave-power motor, the combination, with the movable float secured and adapted to move within an open space between piers, of anchor-chains for securing the float and preventing it from striking the piers, reciprocating racks located above the piers, cables connecting said float and racks, guiding sheaves or pulleys to properly guide said cables, power-transmitting wheels secured beneath the racks, and teeth projecting from said wheels and adapted to engage with said racks, substantially as set forth and described.

3. In a wave-power motor, the combination, with the reciprocating racks, of the power-transmitting wheels located beneath said racks, movable teeth secured to said wheels near the periphery thereof, and the stops located upon said wheels so as to limit the movement of the teeth, substantially as set forth and described.

4. In a wave-power motor, the combination, with the float-frame thereof, of the float adapted to be moved by the action of the waves, cables attached to said float and frame so as to take the various irregular movements of said float, sheaves arranged so as to properly guide said cables, counter-weights secured to the opposite ends of the cables so as to maintain the tension thereon, and the racks attached to said cables and adapted to be operated by the movement of the cables, as set forth.

5. In a wave-power motor, the combination, with the movable racks operated by the movement of the float, of the power-transmitting wheels secured upon shaft located within suitable frame-work below the reciprocating racks and the pivoted teeth secured near the periphery of the power-wheels, said teeth adapted to engage with the racks so as to impart rotary motion to the said wheels, substantially as set forth and described.

6. In a wave-power motor, the combination, with the pier-frame, of the reciprocating racks secured thereon and adapted to be operated through the medium of suitable cables by the motion of the float, a shaft secured beneath the racks, wheels mounted upon the shaft, and the teeth secured to the wheels, said teeth adjusted so as to automatically engage with the racks while moving in one direction and to tip into the rim of the wheel when the racks are moving in the opposite direction, substantially as set forth.

7. The combination, in a wave-power motor, of the herein-described stop mechanism, consisting of the curved strap suitably secured beneath the rollers on the crank-arms projecting from the shaft of the operating-teeth, and the operating-lever for raising or lowering said strap, so as to throw the same in or out of contact with said rollers, substantially as set forth and described.

8. In a wave-power motor, the combination, with the power-transmitting wheels, of the stop mechanism consisting of the curved strap suitably secured so as to lie out of contact with the rollers, said strap being adapted to be raised so as to come in contact with the rollers on the crank-arms, so as to throw the operating-teeth out of contact with the moving racks, substantially as set forth and described.

9. In a wave-power motor, the combination, with the power-transmitting wheels, of the operating-teeth secured within the rim thereof, crank-arms connected to shaft of said teeth, curved straps pivotally secured to upwardly-extending standards, outwardly-extending lever pivotally secured to the opposite end of the strap, weights secured to said lever, and the operating-lever for raising or lowering the strap through the medium of the pivoted lever, so as to throw the teeth in or out of contact with the operating-racks, substantially as set forth and described.

10. In a wave-power motor, the combination, with the movable float secured and adapted to move within an open space between piers and to receive all the various regular and irregular movements of the waves, of anchor-chains for securing the float, reciprocating racks located above the pier, cables connected to the float and racks, and power-transmitting wheels secured beneath the racks and adapted to be operated by the movement thereof, substantially as set forth and described.

In witness whereof I have hereunto set my hand.

EDWARD D. STODDER.

Witnesses:
JOSEPH A. BAYLESS,
S. H. NOURSE.